Nov. 5, 1946.  J. L. BREESE  2,410,478
GENERATOR TYPE BURNER
Filed Aug. 6, 1943
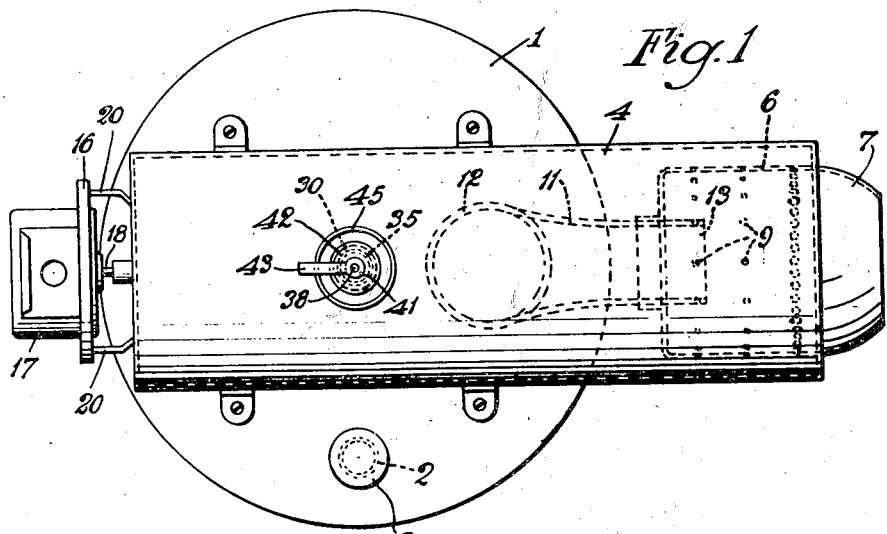
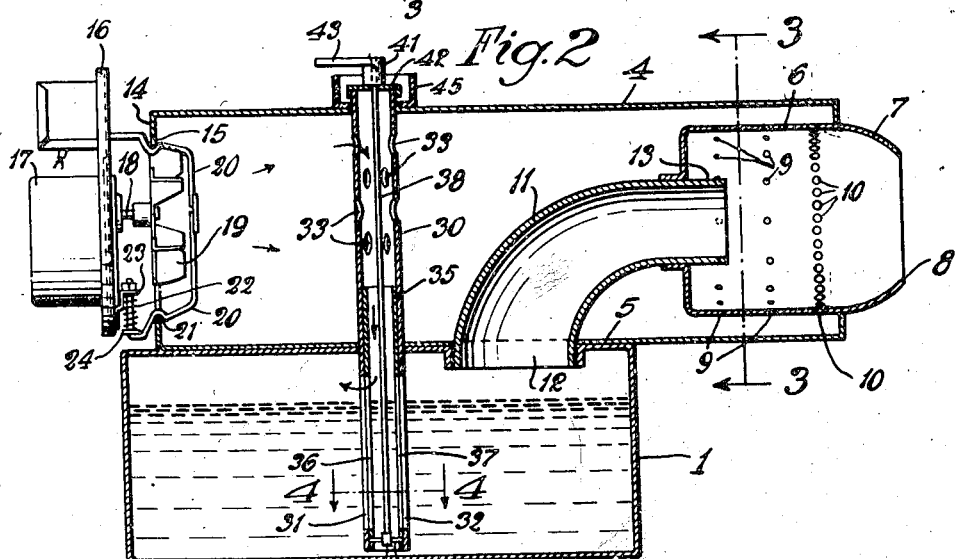
Inventor
James L. Breese
by Parker & Carter
Attorneys Patented Nov. 5, 1946

2,410,478

UNITED STATES PATENT OFFICE 2,410,478

GENERATOR TYPE BURNER

James L. Breese, Santa Fe, N. Mex., assignor to Oil Devices, Santa Fe, N. Mex., a limited partnership of Illinois Application August 6, 1943, Serial No. 497,589

7 Claims. (Cl. 158—91)

My invention relates to an improvement in burners and is shown in connection with burners of a generator type.

One purpose is to provide an improved forced draft of a generator burner.

Another purpose is to provide a compact body which may be employed as a blast burner or blow torch.

Another purpose is to provide an improved horizontal burner with forced draft.

Other purposes will appear from time to time throughout the specification and claims.

My invention is illustrated more or less diagrammatically in the accompanying drawing, wherein:

Figure 1 is a plan view;

Figure 2 is a vertical section;

Figure 3 is a section along the line 3—3 of Figure 2;

Figure 4 is a section along the line 4—4 of Figure 2;

Figure 5 is a section similar to Figure 4, with parts in a different position.

Like parts are indicated by like characters throughout the specification and drawing.

Referring to the drawing, 1 generally indicates a base container, or generator container, or vaporizing chamber, adapted to serve as a fuel reservoir. Any suitable means may be employed for admitting air thereto, for example a filler tube 2 with its removable cap 3, as shown in Figure 1. Positioned on the top of the reservoir 1 is an air housing 4 shown as having a flat bottom 5 adapted to be secured to the flat top of the container 1. It will be understood, of course, that the size, shape and proportion of the parts may be widely varied.

Positioned in any suitable manner in one end of the housing 4 is a burner pot 6. This pot is shown as having an inwardly curved or tapered discharge portion 7, the inner edge of which defines the central aperture 8. It will be observed that the wall of the pot 6 is spaced inwardly from the wall of the housing 4. The pot wall is provided with a plurality of air inlets 9, located at various distances from the bottom or inner end of the pot and a terminal outer row of air inlet apertures 10 shown in Figure 2 have a greater diameter and are more closely placed than the apertures 9. The interior of the pot 6 is put in communication with the interior of the reservoir 1 by a curved passage member 11, one end of which is herein shown as of maximum diameter, being open to the interior of the reservoir 1, as at 12, at a level above the level of the fuel in the reservoir. The passage 11 then curves upwardly and to the right, referring to the position of the parts as shown in Figure 2, and extends to or into the bottom of the pot 6 as at 13.

The opposite end of the passage 4 is partially closed by a circular flange 14 with a central aperture 15. Mounted in the aperture 15 is a booster motor and fan unit including a motor base 16, a motor 17 thereon, a fan shaft 18, driven by the motor, and fan vanes 19. The motor and fan unit may be mounted for ready removal in the aperture 15 by means of any suitable system of spring wires 20, inwardly notched as at 21 to engage the edges of the aperture 15. A coil spring 22 may be compressed between the abutment 23, fixed on the base 16 and the abutment 24 on one of the springs or spring arms 20. The effect is to maintain the motor and fan unit locked in position by the engagement of the notches 21 with the edges of the aperture 15. However, the user can readily remove the motor and fan unit by squeezing any one of the wires 20 and thus freeing the notches 21 from the edge of the aperture. Any suitable conductive connections and selected power source may be employed, the details of which do not form part of the present invention and are therefore not disclosed.

The combustion of the burner is controlled by varying the supply of air to the interior of the generator chamber 1. I illustrate for example a fixed outer tube 30 which extends downwardly through the housing 4 and into the interior of the generator reservoir 1. It is slotted as at 31, 32 to provide an air inlet to the space within the generator 1 and above the level of the fuel therein. The height of the slots is sufficient to permit the device to work through a substantial variation in the level of fuel within the member 1. Air passes into the tube 30 through one or more apertures 33 in the portion of the tube located in the interior of the air housing 4. The rate of air flow through the slots 31 and 32 may be controlled by a rotatable inner shutter tube 35, which is slotted as at 36, 37. The inner tube 35 is rotated and supported by a control rod 38 which is secured to the tube by any suitable cross members which are shown as including a bottom hub 39 and radial arms 40. At the upper end of the tube is a limiting abutment 41 which engages the closed top 42 of the outer tube 30. The member 41 may be provided with a handle 43 for the rotation of the inner tube or shutter 35. The top 42 of the outer tube may be made removable, if desired, so that the device may be disassembled.

Combustion may be initiated by pouring an inflammable liquid down through the outer tube 30, the top 42 and the inner tube structure being previously removed. If desired, a starting cup 43 may be employed, the inflammable liquid being poured into the cup and lighted so that it will flow down into the generator chamber 1, and initiate combustion therein.

In the use of the device, partial combustion takes place in the chamber 1. Once combustion has been initiated, the fuel in the chamber 1 is vaporized, and the vaporized fuel, with the by-products of the limited combustion which takes place, flow upwardly and outwardly along the passage 11 and into the interior of the pot 6. There additional air is supplied to the mixture through the apertures 9 and a final air supply through the apertures 10. The air is supplied under pressure through these apertures, in response to the rotation of the fan vanes 19. It will be understood that, once combustion has been initiated, the inner shutter tube 35 is put in position. Its length is preferably such as not to mask the air inlet apertures 33. Part of the air delivered by the fan vanes flows through the apertures and down into the member 1. Part of the air is delivered through the apertures 9 and 10 and the fuel vaporized in the chamber 1 flows to the interior of the pot for conversion by the additional air supply to a completely combustible gas.

I have illustrated the device in a form practical for use as a blow torch for delivering a hot flame under pressure, to a point or area to be highly heated. It will be understood, however, that the parts may be so sized and proportioned as to adapt the device for a heater or burner for use in furnaces, stoves and the like.

It will be observed that I have provided a unitary air supply system which delivers air, preferably under pressure, both to a burner or burner pot and to a generator chamber in communication with the pot. It will also be observed that the passage of air under pressure about the pot not only supplies air necessary for final and complete combustion of the vaporized fuel but provides a cooling curtain between the burner pot and the source of fuel supply.

It will be realized that whereas I have described and illustrated an operative device, still many changes might be made in the size, shape, arrangement, proportion and disposition of the parts without departing materially from the spirit of my invention. I wish, therefore, that my showing be taken as in a large sense diagrammatic.

I employ the term "generator" or "generator burner" in relation to a burner or burner chamber in which some degree of combustion takes place in a fuel chamber and generates a gaseous fuel which is burned in a separate or combustion chamber. Thus, I describe the element 1 as a generator container, since it contains a liquid fuel and since it serves as a chamber in which a gaseous fuel is generated by combustion taking place in the generator chamber 1. The chamber 1 acts as a generator chamber. Similarly, I employ the term "air chamber" or "air chamber element" of the element 4, which serves to deliver air both to the generator chamber and to the burner chamber, as will be clear from Figure 2.

I claim:

1. In a generator burner, a fuel vaporizer having an imperforate side wall and adapted to hold a substantial body of liquid fuel, a combustion chamber, means for delivering vaporized fuel from the interior of the fuel vaporizer to the interior of the combustion chamber, including a tubular passage, and unitary means for delivering air under pressure to the interior of the fuel vaporizer and to the interior of the combustion chamber.

2. In a generator burner, a fuel vaporizer, having an imperforate side wall and adapted to hold a substantial volume of liquid fuel, a burner pot having a circumferential wall and an open end, said circumferential wall having a plurality of air inlet apertures located at various distances from said open end, a tubular passage adapted to deliver vaporized fuel from the interior of the fuel vaporizer to the interior of the burner pot, and unitary means for delivering air to the interior of the fuel vaporizer and, through said air inlet apertures, to the interior of the burner pot, said means including an air chamber having a portion surrounding said burner pot.

3. In a generator burner, a fuel vaporizer, having an imperforate side wall and adapted to hold a substantial volume of liquid fuel, a burner pot having a circumferential wall and an open end, said circumferential wall having a plurality of air inlet apertures located at various distances from said open end, a tubular passage adapted to deliver vaporized fuel from the interior of the fuel vaporizer to the interior of the burner pot, and unitary means for delivering air to the interior of the fuel vaporizer and, through said air inlet apertures, to the interior of the burner pot, including an air chamber having a portion surrounding said burner pot, and shutter means adapted to vary the rate of flow of air from said air chamber to the interior of said fuel vaporizer.

4. In a generator burner, a fuel vaporizer, having an imperforate side wall and adapted to hold a substantial volume of liquid fuel, a burner pot having a circumferential wall and an open end, said circumferential wall having a plurality of air inlet apertures located at various distances from said open end, a tubular passage adapted to deliver vaporized fuel from the interior of the fuel vaporizer to the interior of the burner pot, and unitary means for delivering air to the interior of the fuel vaporizer and, through said air inlet apertures, to the interior of the burner pot, including an air chamber having a portion surrounding said burner pot, and a fan adapted to deliver air under pressure to the interior of said air chamber and means for actuating said fan.

5. In a self-contained generator burner, a fuel vaporizing chamber, having an imperforate side wall and adapted to hold a substantial body of liquid fuel, an air chamber mounted on the top of said vaporizing chamber, a burner pot having an open end and a circumferential wall with a plurality of air inlet apertures located at various distances from said open end, said burner pot being partially surrounded by said air chamber, a tubular passage adapted to deliver vaporized fuel from the interior of the vaporizing chamber to the interior of the burner pot, an air delivery passage extending from the interior of the air chamber to the interior of the vaporizing chamber, the air inlet apertures of the pot being enclosed within said air chamber, unitary means for delivering air under pressure to the interior of said burner pot through said air inlet apertures and to the interior of said vaporizing chamber through said air inlet passage, including a fan adapted to deliver air under pressure to the interior of said air chamber and means for actuating said fan.

6. In a self-contained generator burner, a fuel vaporizing chamber having an imperforate side wall and adapted to hold a substantial body of liquid fuel and adapted to serve as a base for the burner as a whole, an air chamber mounted on the top of the vaporizing chamber, a horizontally axised burner pot having an open end and a circumferential wall with a plurality of air inlet apertures located at various distances from said open end, said burner pot and said apertures being surrounded by said air chamber, with said open end exposed, a tubular passage adapted to deliver vaporized fuel from the interior of the vaporizing chamber to the interior of the burner pot, an air delivery passage extending from the interior of the air chamber to the interior of the vaporizing chamber, means for adjustably controlling the rate of flow through said passage to the vaporizing chamber and means for delivering air under pressure to the interior of said air chamber including a fan mounted on said air chamber and means for actuating it.

7. In a generator burner, a fuel vaporizer having an imperforate side wall and adapted to hold a substantial body of liquid fuel, a combustion chamber, means for delivering vaporized fuel from the interior of the fuel vaporizer to the interior of the combustion chamber, including a tubular passage, and unitary means for delivering air under pressure into the interior of the fuel vaporizer and to the interior of the combustion chamber and means for varying the relative rate of air delivery to the fuel vaporizer and to the combustion chamber.

JAMES L. BREESE.